United States Patent
Akidau et al.

(10) Patent No.: US 11,250,006 B1
(45) Date of Patent: *Feb. 15, 2022

(54) REAL-TIME STREAMING DATA INGESTION INTO DATABASE TABLES

(71) Applicant: Snowflake Inc., Bozeman, MT (US)

(72) Inventors: Tyler Arthur Akidau, Seattle, WA (US); Istvan Cseri, Seattle, WA (US); Tyler Jones, Redwood City, CA (US); Daniel E. Sotolongo, Seattle, WA (US); Zhuo Zhang, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,258

(22) Filed: Jul. 27, 2021

Related U.S. Application Data

(63) Continuation of application No. 17/226,423, filed on Apr. 9, 2021, now Pat. No. 11,100,111.

(51) Int. Cl.
*G06F 16/245* (2019.01)
*G06F 16/2455* (2019.01)
*G06F 16/2453* (2019.01)

(52) U.S. Cl.
CPC .. *G06F 16/24568* (2019.01); *G06F 16/24544* (2019.01)

(58) Field of Classification Search
CPC ............ G06F 16/24568; G06F 16/24544
USPC ........................................................ 707/714
See application file for complete search history.

(56) References Cited

U.S. PATENT DOCUMENTS

| | | | |
|---|---|---|---|
| 8,271,734 B1 * | 9/2012 | Glasco | G06F 12/084 711/130 |
| 10,437,780 B2 | 10/2019 | Zukowski et al. | |
| 10,592,525 B1 * | 3/2020 | Khante | G06F 16/245 |
| 11,055,280 B2 | 7/2021 | Huang et al. | |
| 11,100,111 B1 | 8/2021 | Akidau et al. | |
| 2004/0170374 A1 | 9/2004 | Bender et al. | |
| 2005/0234894 A1 | 10/2005 | Tenazas | |
| 2005/0253739 A1 | 11/2005 | Hi | |
| 2005/0256908 A1 | 11/2005 | Yang et al. | |
| 2006/0010148 A1 | 1/2006 | Sattler et al. | |
| 2018/0121519 A1 * | 5/2018 | Cook | G06F 16/2471 |
| 2019/0163754 A1 * | 5/2019 | Huang | G06F 16/2255 |

OTHER PUBLICATIONS

"U.S. Appl. No. 17/226,423, Notice of Allowability dated Jul. 8, 2021", 12 pgs.

(Continued)

*Primary Examiner* — Hares Jami
(74) *Attorney, Agent, or Firm* — Schwegman Lundberg & Woessner, P.A.

(57) ABSTRACT

A streaming ingest platform can improve latency and expense issues related to uploading data into a cloud data system. The streaming ingest platform can organize the data to be ingested into per-table chunks and per-account blobs. This data may be committed and may be made available for query processing before it is ingested into the target source tables. This significantly improves latency issues. The streaming ingest platform can also accommodate uploading data from various sources with different processing and communication capabilities, such as Internet of Things (IOT) devices.

21 Claims, 10 Drawing Sheets

(56) References Cited

OTHER PUBLICATIONS

"U.S. Appl. No. 17/226,423, Notice of Allowance dated Jun. 17, 2021", 18 pgs.
"U.S. Appl. No. 17/302,049, Non Final Office Action dated Jun. 30, 2021", 10 pgs.
"U.S. Appl. No. 17/302,049, Response filed Sep. 30, 2021 to Non-Final Office Action dated Jun. 30, 2021", 8 pgs.
"U.S. Appl. No. 17/302,049, Notice of Allowance dated Oct. 20, 2021", 10 pgs.

* cited by examiner

REAL-TIME STREAMING DATA INGESTION INTO DATABASE TABLES

CROSS-REFERENCE TO RELATED APPLICATION

This application is a Continuation of U.S. patent application Ser. No. 17/226,423 filed Apr. 9, 2021, the contents of which are incorporated herein by reference in their entirety.

TECHNICAL FIELD

The present disclosure generally relates to data systems, such as databases, and, more specifically. to real-time streaming data ingestion into a data system.

BACKGROUND

Data systems, such as database systems, may be provided through a cloud platform, which allows organizations and users to store, manage, and retrieve data from the cloud. A variety of techniques can be employed for uploading and storing data in a database or table in a cloud platform.

To upload data into a data system, conventional systems typically use an "insert" or "copy" command. For example, a user can copy new data using a "copy" command, which also necessitates the use of a running warehouse for transferring the data to the target table. This conventional approach suffers from significant drawbacks. These commands must be manually initiated by a user. This manual initiation can cause latency issues with respect to how fresh the data is in the target table, depending on how often the commands are initiated. This manual initiation can also cause some or all the data to be lost if the task fails. Also, operating a running warehouse to perform these commands typically incurs large expenses. Some automated techniques suffer from similar drawbacks of low latency and high expenses.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A streaming ingest platform, as described herein, can improve latency and expense issues related to uploading data into a cloud data system. The streaming ingest platform can organize the data to be ingested into per-table chunks in a per-account blob. This data may be committed and then made available for query processing before it is ingested into the target source tables (e.g., converted to target source table format). This significantly improves latency issues. The streaming ingest platform can also accommodate uploading data from various sources with different processing and communication capabilities, such as Internet of Things (IOT) devices. Moreover, the streaming ingest platform may upload the data asynchronously to provide more flexible control.

Figure 1:
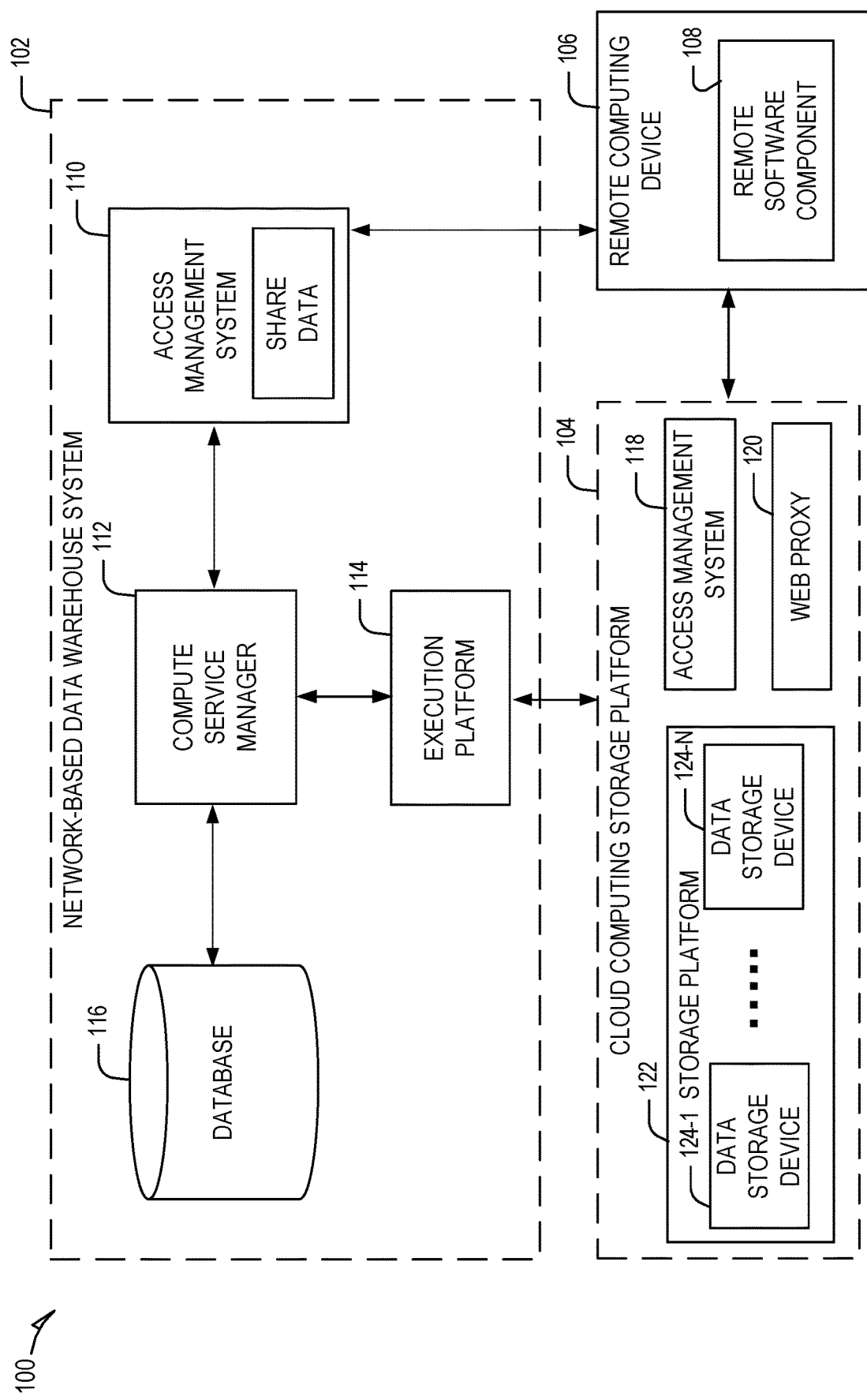
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
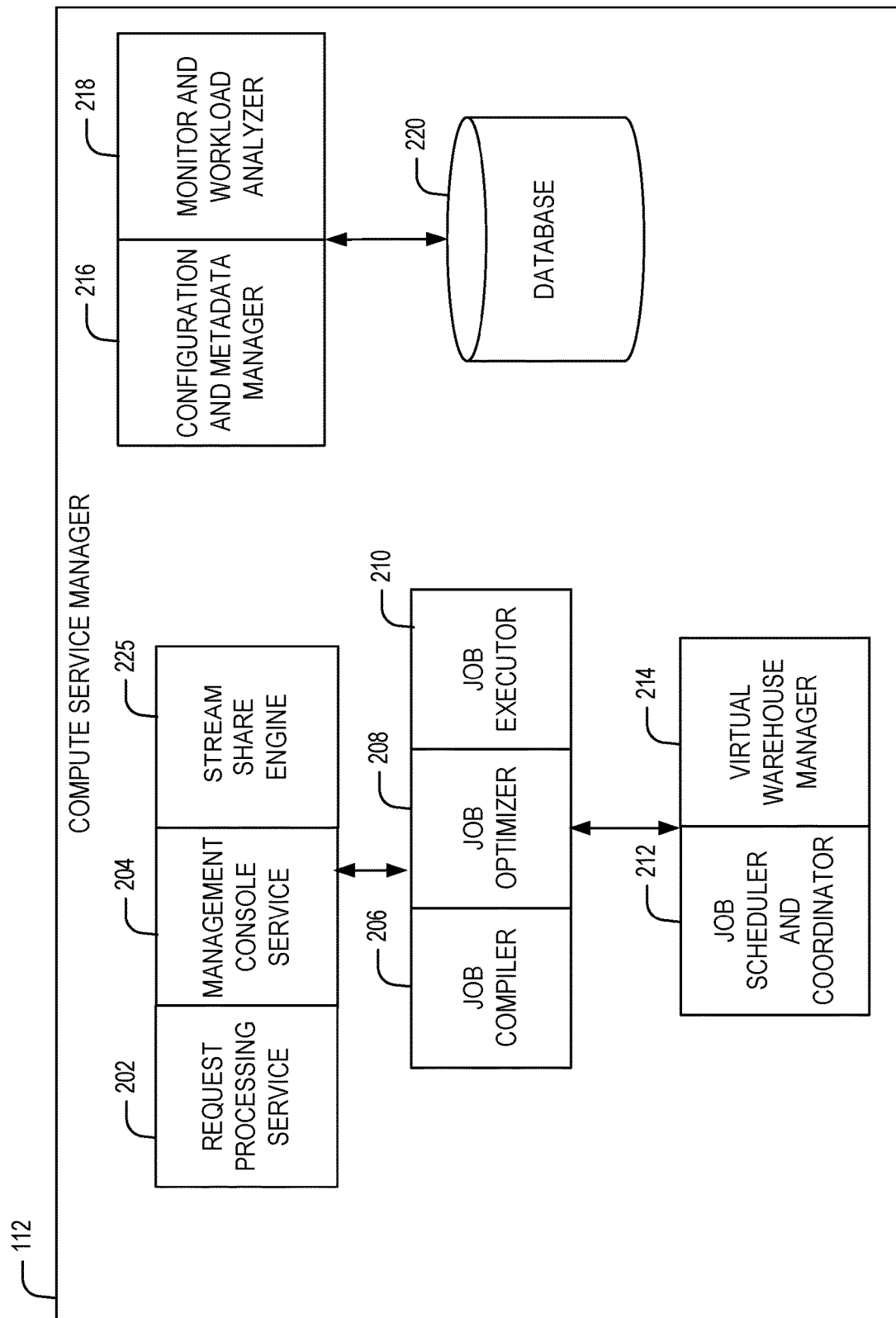
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
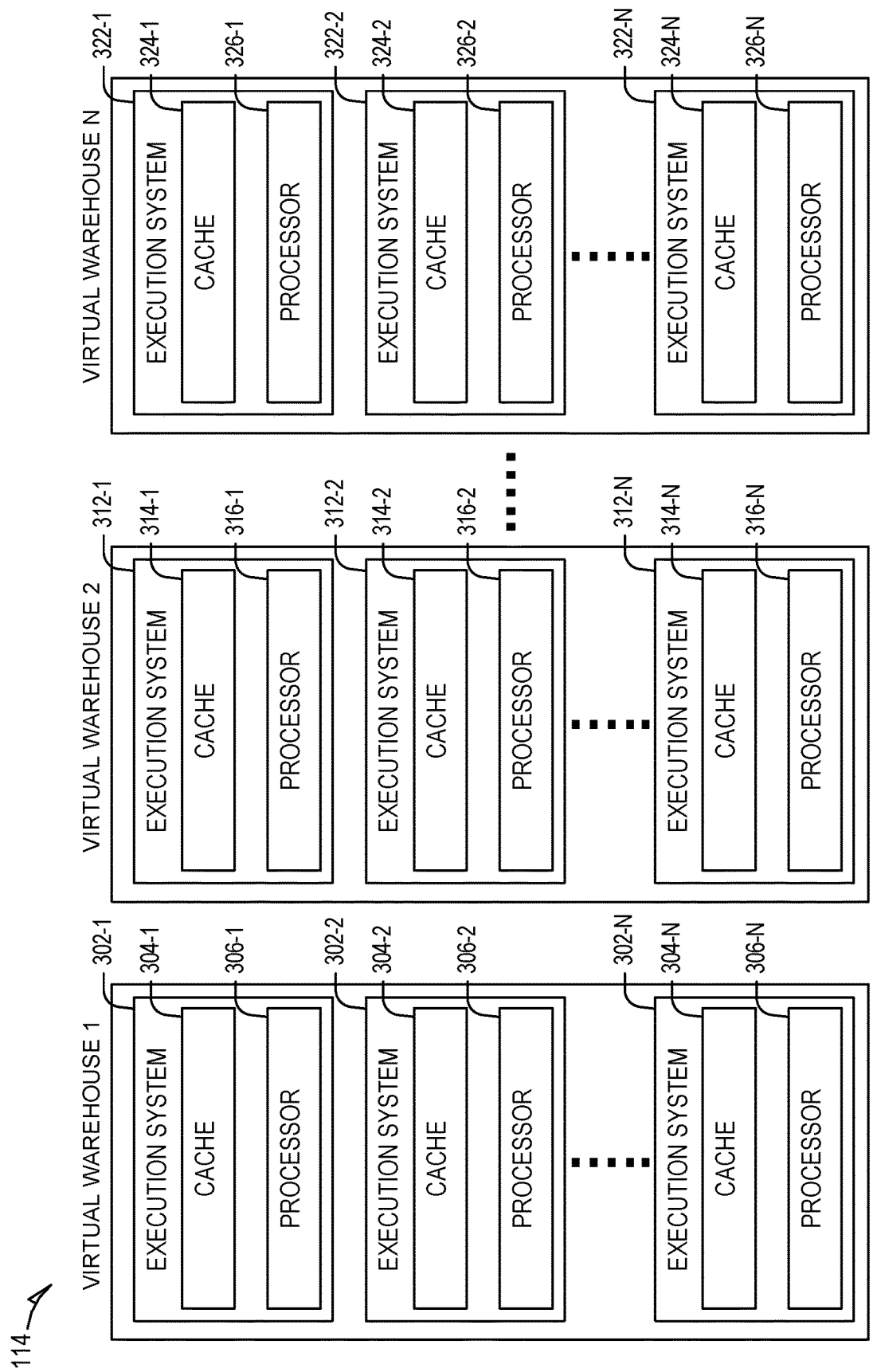
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
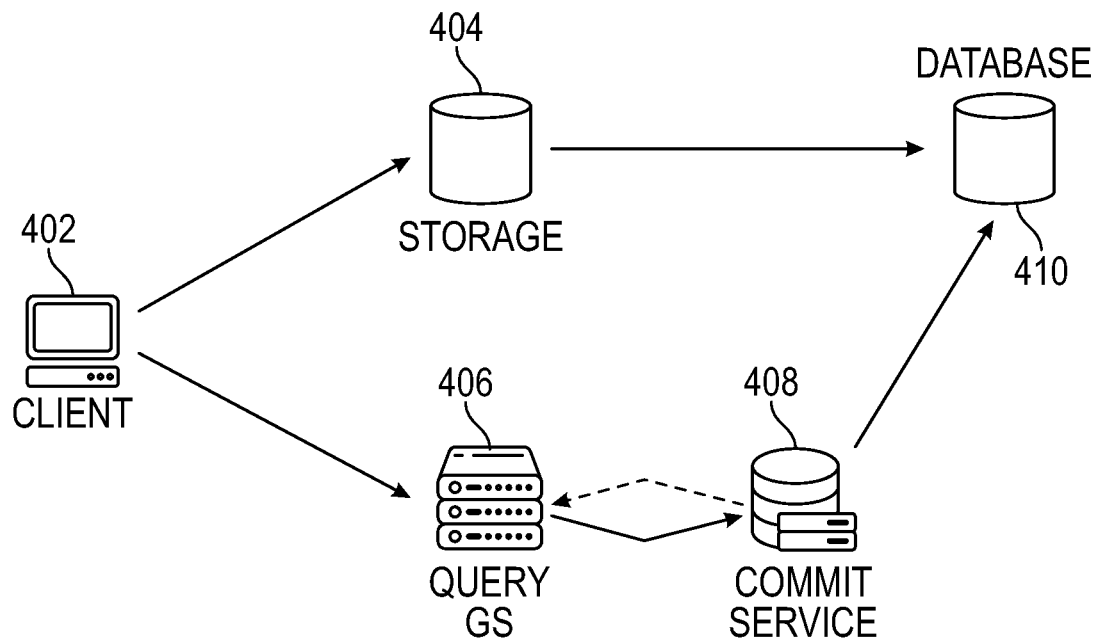
FIG. 4 shows a computing environment, according to some example embodiments.

Next, techniques for real-time streaming data ingestion into a data system will be described. FIG. 4 shows an example of a computing environment, according to some example embodiments. The computing environment may include a client 402, a storage 404, a query global service (GS) 406, a commit service 408, and a database 410.

The client 402 may include a software development kit (SDK) to run software programs to generate the file structures described herein. The client 402 may communicate with the data system to upload data to be ingested into one or more tables. The client 402 may open one or more channels to the data system. A channel may be a logical connection to a particular table stored in the data system, such as in the database 410. The data system, e.g., in the database 410, may include a plurality of tables associated with an account for the client 402.

The client 402 may write new data, such as rows, into the one or more channels. The client 402 may include a buffer. The client 402 may buffer the outgoing data into per-table sets (also referred to as "chunks" herein). A chunk may be associated with a single table (i.e., all data in a chunk is addressed to a single table); however, a table may be associated with a plurality of chunks at a time. The data in the chunks may be provided in a first format. For example, the data in the chunks may be provided in the format used by the client 402 (e.g., Arrow format). The chunks may be buffered into per-account groups (also referred to as "blobs" herein). A blob may contain chunks associated with different tables of the same account.

The buffer may include a threshold, e.g., a size or time threshold. When the threshold is crossed or exceeded, the client 402 may transfer the blobs in its buffer to the storage 404. The storage 404 may be provided as cloud storage and may be a part of the data system. Additionally or alternatively, the storage 404 may be provided as internal storage of the data system. In another embodiment, the storage 404 may be provided as external storage to the data system. In any event, the data system may have access to the storage 404. The client 402 may write the blobs to an internal stage in the storage 404. The client 402 may use an API for the storage 404 to perform the write operation. The storage 404 may receive the blobs from the client 402 and may store them in the first format.

The client 402 may also transmit a registration request to the query GS 406 in the data system. The registration request may include information about the blobs stored at the storage 404, such as identification information for the blobs and the location where the blobs are stored (e.g., network address). The client 402 may register the blobs via a REST API call to the query GS 406.

The query GS 406 may communicate with the commit service 408. The query GS 406 may fan the blob registration requests into per-table chunk registration requests and transmit the per-table chunk registration requests to the commit service 408. The commit service 408 may queue the per-table chunks and may validate and dedupe them using sequencing information, described in further detail below. The commit service 408 may fast commit the data via RPC to generate a hybrid table. The commit service 408 may write the data to a metadata store to commit the data. The committing of the data may be used to generate a hybrid table, which can be used for immediate query processing of the committed data. The hybrid table may include data from the blobs in a first format (e.g., Arrow format) and data in the one or more tables stored in database 410 in a second format (e.g., FDN). The hybrid table may make the data in the blobs in the storage 404 available for query processing, as described in further detail below.

The database 410 may store the tables associated with different accounts. Each account may have one or more tables associated therewith. The data stored in the blobs (organized by per-table chunks) in the storage 404 may be ingested into corresponding tables in the database 410 after it has been committed. After the data is ingested into the corresponding tables in the database 410, that data may be removed from the storage 404 (e.g., flushed).

Figure 5:
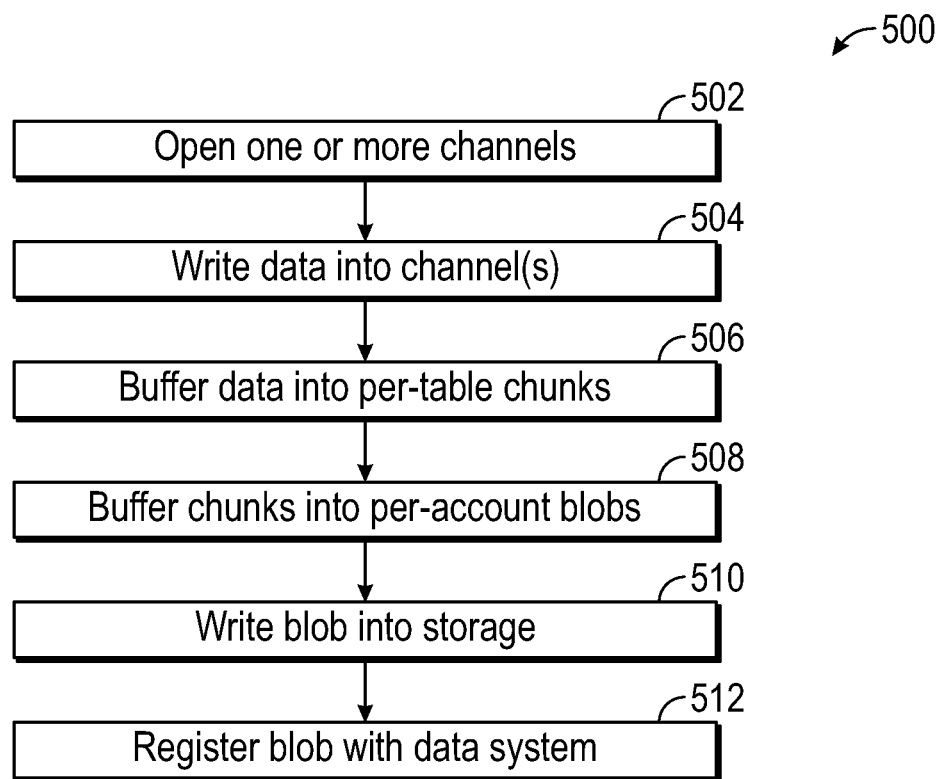
FIG. 5 shows a flow diagram of a method for generating a blob, according to some example embodiments.

FIG. 5 shows a flow diagram of a method 500 for generating a blob, according to some example embodiments. In an example, portions of the method 500 may be performed by the client 402 (e.g., using a client SDK). At operation 502, the client may open one or more channels to a table stored in the data system. The number of channels may depend on the amount of data to be transferred to the data system. The number of channels may depend on the number of tables implicated in the data transfer. At operation 504, the client may write data (e.g., rows) into the channels. The data may be in a first format (e.g., Arrow format). At operation 506, the data may be buffered into per-table chunks in the first format. Hence, each chunk may contain data for only one table. At operation 508, the chunks may be buffered into per-account blobs. Hence, each blob may contain data for one or more tables but for only one account. An account may have a plurality of tables associated with it in the data system.

The client may also insert ordering or sequencing information. For example, the client may insert client and row sequencing information. The client sequencing information may be related to the channel. Each channel may be client specific; hence, only one client may have ownership of a channel at a time. The client sequencing information may prevent concurrent usage of the channel by multiple clients (accounts). The data system may use the client sequencing information to identify the present owner of the channel and prevent other accounts from using the same channel.

The row sequencing information may provide information related to each record or row. Each record or row may be stamped with a row sequencer. This row sequencing information may then be used by the data system to check for duplicate data or gaps in the data. For example, if the data system receives two records with the same row sequencing information, it may detect a duplicate. On the other hand, if the data system receives record 1 and then record 3, it may detect that it did not receive record 2. Also, the row sequencing information may be used to maintain the ordering of the data.

The client may also insert an offset token. The client may use the offset token information in case there was an error in the blob transmission. In the case of a client failure, the offset token may indicate which data was correctly received by the data system, so the client may restart its transmission without having to duplicate already received data and without including gaps in the data.

The buffer may have a threshold associated therewith. For example, the buffer may include a size and/or time threshold. At operation 510, the client may write the blob into storage. For example, the client may write the blob into storage in response to the buffer's threshold being exceeded. The client may write the blob to an internal stage associated with the account in the storage (e.g., Streaming Ingest internal stage). The client may use storage API to perform the write operation.

At operation 512, the client may register the blob with the query GS in the data system. The client may transmit a registration request to the query GS. The registration request may include information about the blob, such as identification information for the blob and the location where the blob is stored, such as an address. The client may register the blob via a REST API call to the query GS. After the data system registers the blob and commits the data therein, it may transmit a confirmation to the client. The client may receive the confirmation. Once the data is committed and before it is ingested into the source table, that data may be available for query processing. From the client perspective, the committed data and data in the tables may be available the same way for query processing.

Figure 6A:
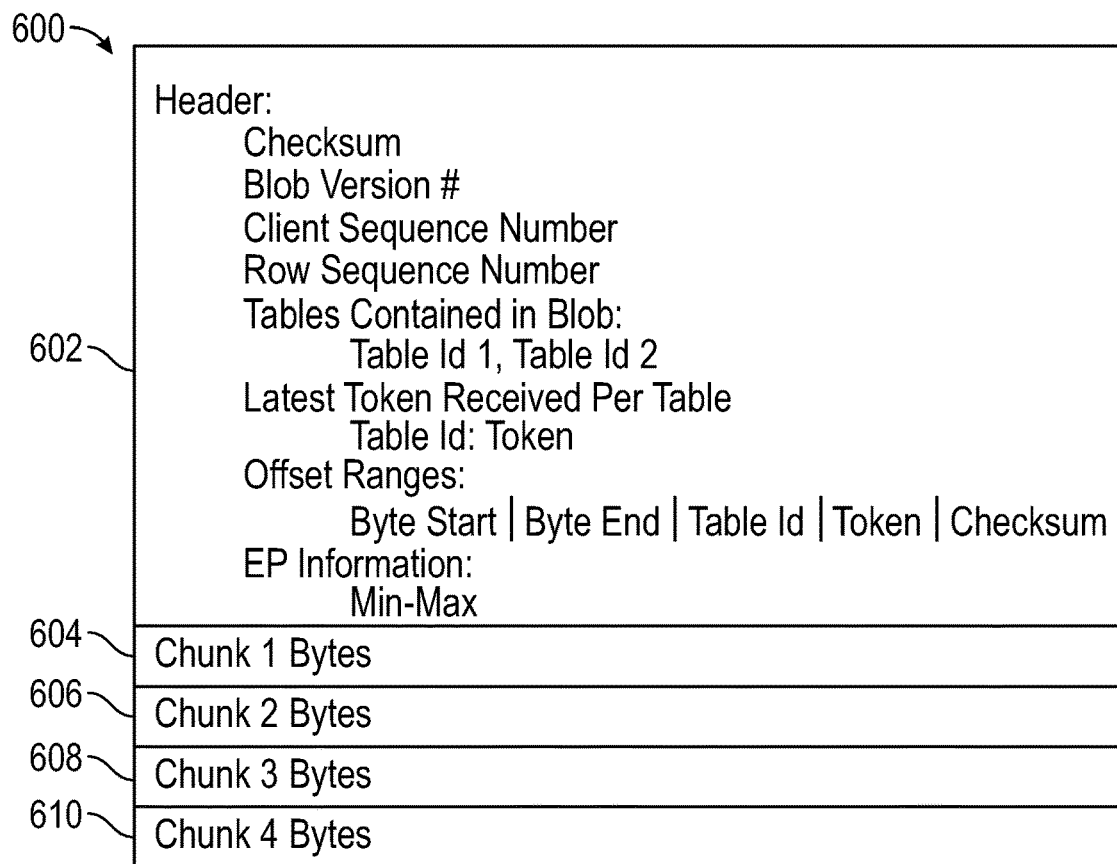
FIG. 6A shows a blob configuration, according to some example embodiments.

FIG. 6A shows an example of a blob 600, according to some example embodiments. The blob 600 may include a header 602 and one or more chunks 604, 606, 608, 610. The header 602 may include information relating blob version, client sequencing (e.g., client sequence number), row sequencing (e.g., row sequence number), tables contained in blob, offset token, and byte ranges of the chunks. The header may also include expression property (EP) information about the chunks. The EP information may include statistics for the chunks 604-610. For example, the EP information may include min-max of a chunk, number of rows, and other statistics. As discussed in further detail below, the data system may use this EP information for optimizing and pruning query processing for the committed data.

As mentioned above, the chunks may be defined per-table. For example, chunk 604 may be associated with table A; chunks 606 and 608 may be associated with table B; and chunk 610 may be associated with table C. The data in the blob 600 may be in the native (first) format of the client (e.g., Arrow format).

Figure 6B:
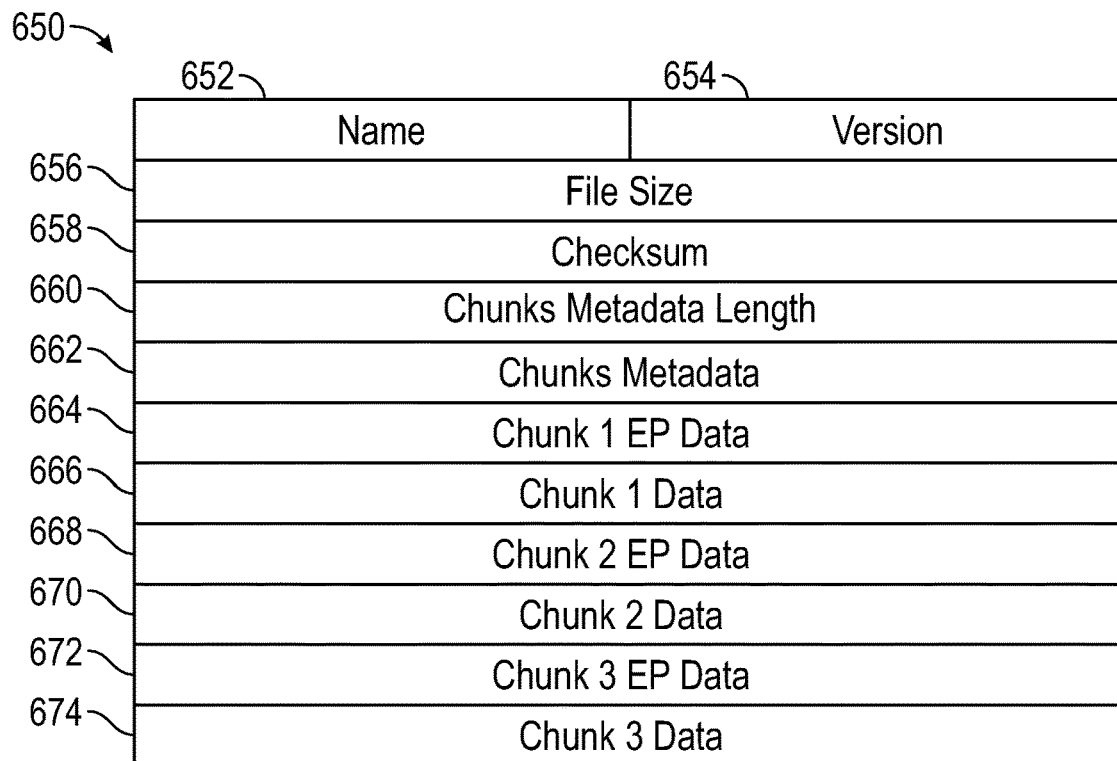
FIG. 6B shows a blob configuration, according to some example embodiments.

FIG. 6B shows another example of a blob 650, according to some example embodiments. The blob 650 may include a blob name field 652, a version field 654, a file size field 656, a checksum field 658, chunks metadata length field 660, and chunks metadata field 662. The blob 650 may also then include chunk data and EP information about each chunk. For example, blob 650 may include Chunk 1 EP Data 664 and Chunk 1 Data 666, Chunk 2 EP Data 668 and Chunk 2 Data 670, and Chunk 3 EP Data 672 and Chunk 3 EP Data 674. The data in the chunks may be in the native (first) format of the client (e.g., Arrow format).

Figure 7:
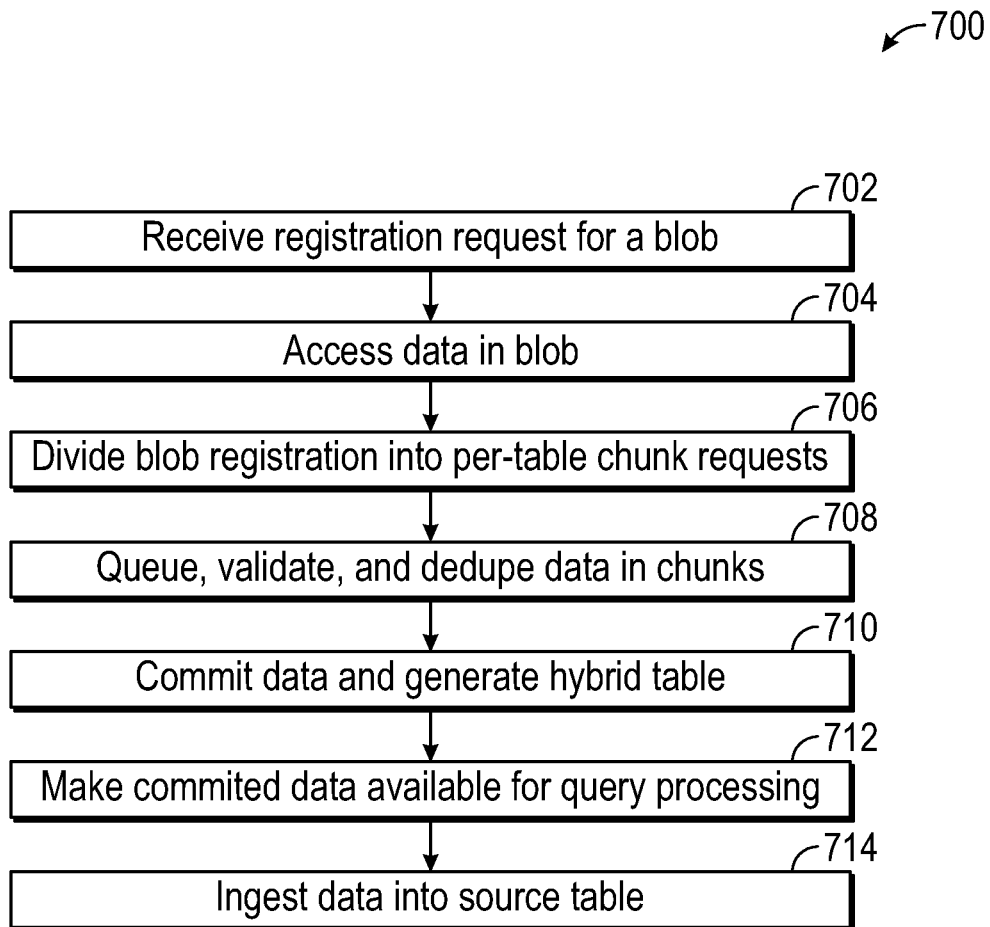
FIG. 7 shows a flow diagram of a method for committing a blob, according to some example embodiments.

FIG. 7 shows a flow diagram of a method 700 for committing a blob, according to some example embodiments. At operation 702, the data system (e.g., query GS) may receive a registration request for the blob. The registration request may include information about the blob, such as identification information for the blob and the location where the blob is stored, such as an address.

At operation 704, the data system may access the stored blob using the information provided in the registration request. The data in the blob (e.g., chunks) may be stored in their native format, which is referred to as a first format herein. At operation 706, the query GS may divide the blob registration request into per-table chunk registration requests and transmit the per-table chunk registration requests to the commit service. At operation 708, the commit service may queue the per-table chunks and may validate and dedupe the data using sequencing information. For example, the commit service may use the client and row sequencing information to validate the incoming data. If an error is detected, the data system may send a notification to the client. For example, the data system may transmit the most recent offset token information to the client, instructing the client to transmit the data based on the offset token information.

At operation 710, the commit service may commit the data via RPC to generate a hybrid table. Data may be written to a metadata store to commit the incoming data. The hybrid table may include data from the chunks in a first format (e.g., Arrow format) and data in the one or more tables stored in database associated with the common account in a second format (e.g., FDN).

At operation 712, the commit service may make the data in the blob available for query processing, as described in further detail below. The hybrid table may allow query processing of data in the blob which is not yet ingested into source tables.

At operation 714, the committed data may be ingested or migrated into their corresponding source table. The ingested data may create new partitions in the source table. The ingestion may be performed using a variety of techniques. In one embodiment, DML operation on the committed data may initiate ingestion. For example, if a DML operation touches upon a section (e.g., a row) of the committed data, that section or the chunk associated with that section may be ingested or migrated to the source table in response to the DML operation. Moreover, a background service may also operate to ingest the committed data at specified times (e.g., intervals). After the committed data has been ingested, that data may be removed from storage.

Figure 8:
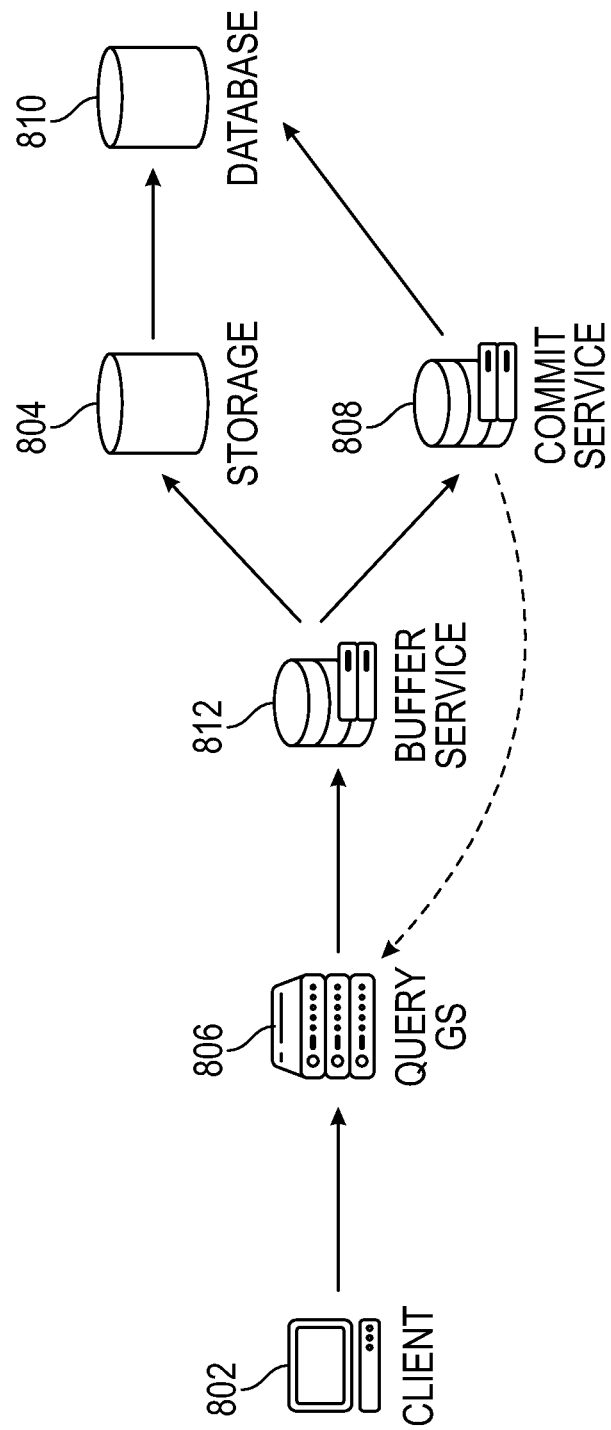
FIG. 8 shows a computing environment, according to some example embodiments.

In the embodiments described above, blob generation was handled primarily by the client (e.g., using client SDK). However, some or all blob generation responsibilities may be performed by the data system. FIG. 8 shows an example of a computing environment, according to some example embodiments. The computing environment may include a client 802, a storage 804, a query global service (GS) 806, a commit service 808, a database 810, and a buffer service 812.

Here, the client 802 may be less robust as the client 402 described above with reference to FIG. 4. The client 802 may communicate with the data system via HTTP calls using REST API, a thin client SDK wrapper, or the like. For example, the client 802 may be provided as Intent of Things (IOT) device, such as an appliance, lights, etc., which may have limited processing and communication capabilities. The client 802 may communicate with the data system to upload data to be ingested into one or more tables. The client 802 may open one or more channels to the data system. A channel may be a logical connection to a particular table stored in the data system. The data system may include a plurality of tables associated with an account for the client 802.

The client 802 may write new data, such as rows, into the one or more channels. The client 802 may transmit the data to the query GS 806. The client 802 may also insert sequencing information (e.g., channel and row sequence numbers) and/or offset token information, as described above.

The query service 806 may forward the data received from the client 802 to the buffer service 812. The buffer service 812 may generate chunks and blobs from the received data as described herein. The buffer service 812 may validate, dedupe, and aggregate data (e.g., rows) from one or more channels associated with the account for the client 802 into per-table sets (also referred to as "chunks" herein). The data in the chunks may be provided in a first format. For example, the data in the chunks may be provided in the format used by the client 802 (e.g., Arrow format). The chunks may be arranged into per-account groups (also referred to as "blobs" herein).

The buffer service 812 may include a threshold, e.g., a size or time threshold. When the threshold is crossed or exceeded, the buffer service 812 may write the blobs to the storage 804. The storage 804 may be provided as cloud storage and may be a part of the data system. Additionally or alternatively, the storage 804 may be provided as internal storage of the data system. In another embodiment, the storage 804 may be provided as external storage to the data system. In any event, the data system may have access to the storage 804. The storage 804 may receive the blobs from the client 802 and may store them in the first format. The buffer service 812 may write the blobs to an internal stage in the storage 804. The buffer service 812 may use an API for the storage 804 to perform the write operation.

The buffer service 812 may communicate with the commit service 808. The buffer service 812 may fan out the per-table chunk registration requests and transmit the per-table chunk registration requests to the commit service 808. The buffer service 812 may provide information for the blobs and the location where the blobs are stored, such as an address. The commit service 808 may queue the per-table chunks and may validate and dedupe then using sequencing information. The commit service 808 may fast commit the data via RPC to generate a hybrid table. The query service 808 may write the data to a metadata store to commit the data. The hybrid table may include data from the blobs in a first format (e.g., Arrow format) and data in the one or more tables stored in database 810 in a second format (e.g., FDN). The hybrid table may make the data in the blobs in the storage 804 available for query processing before the data is ingested into the one or more tables stored in the database 810, as described in further detail below.

The database 810 may store the tables associated with different accounts. Each account may have one or more tables associated therewith. The data stored in the blobs (organized by per-table chunks) in the storage 804 may be ingested into corresponding tables in the database 810. After the data is ingested into the corresponding tables in the database 810, that data may be removed from the storage 804.

Figure 9:
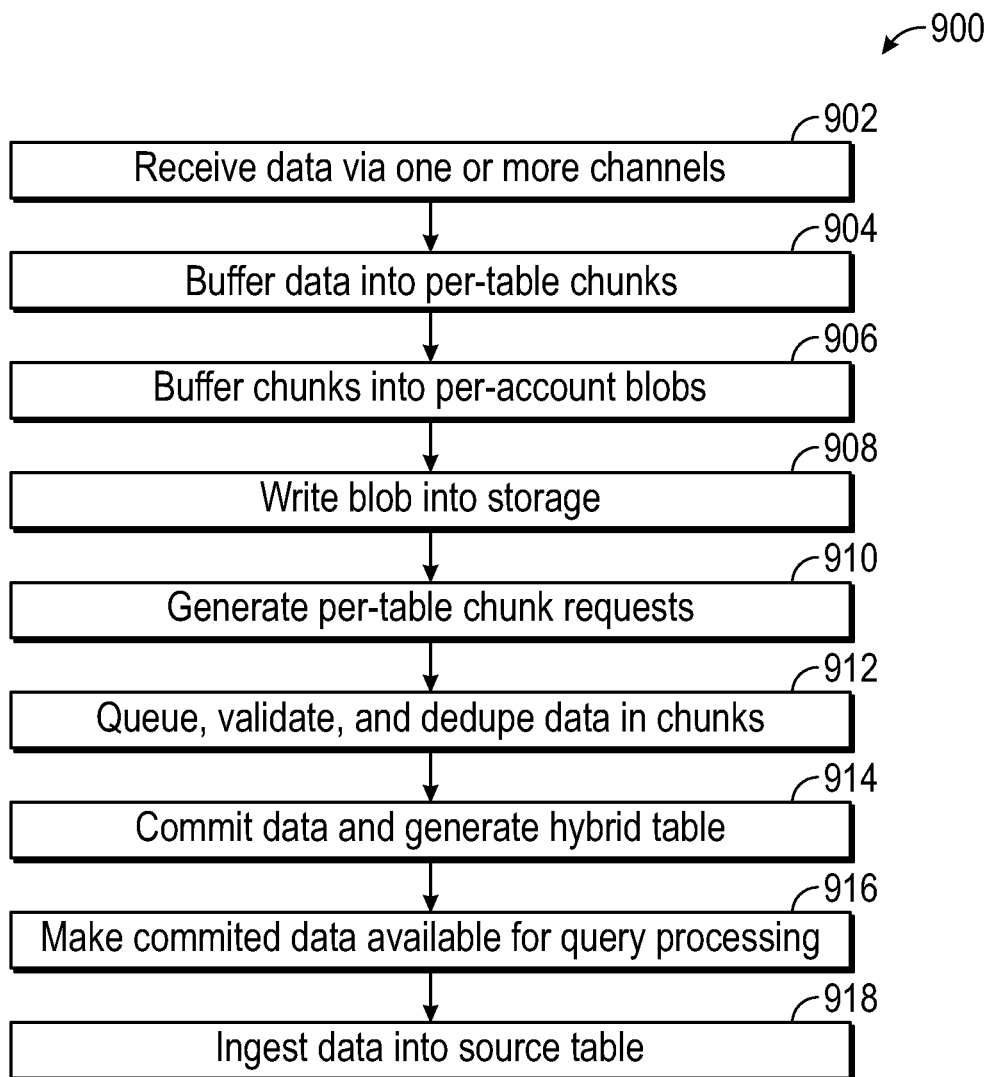
FIG. 9 shows a flow diagram of a method for generating and committing a blob, according to some example embodiments.

FIG. 9 shows a flow diagram of a method 900 for generating and committing a blob, according to some example embodiments. The method 900 may be executed by a data system and its components. At 902, the data system may receive the incoming data from a client via one or more channels, for example, as described above with reference to FIG. 8. The incoming data may be received via a HTTP call. The incoming data may include client and row sequencing information and offset token information. The incoming data may also include related EP information.

At operation 904, the data may be buffered into per-table chunks in the first format. Hence, each chunk may contain data for only one table. At operation 906, the chunks may be buffered into per-account blobs. Hence, each blob may contain data for one or more tables but for only one account. An account may have a plurality of tables associated with it in the data system. The data system may include a buffer having a threshold associated therewith. For example, the buffer may include a size and/or time threshold.

At operation 908, the data system (e.g., buffer service) may write the blob into storage. For example, the buffer service may write the blob into storage in response to the buffer's threshold being exceeded. The buffer service may write the blob to an internal stage associated with the account in the storage (e.g., Streaming Ingest internal stage). The buffer service may use storage API to perform the write operation. The data in the blob (e.g., chunks) may be stored in their native format, which is referred to as a first format herein.

At 910, the data system (e.g., buffer service or query GS) may generate per-table chunk registration requests and transmit the per-table chunk registration requests to the commit service. At 912, the commit service may queue the per-table chunks and may validate and dedupe the data using sequencing information. For example, the commit service may use the client and row sequencing information to validate the incoming data. If an error is detected, the data system may send a notification to the client. For example, the data system may transmit the most recent offset token information to the client, instructing the client to transmit the data based on the offset token information.

At operation 914, the commit service may commit the data via RPC to generate a hybrid table. Data may be written to a metadata store to commit the incoming data. The hybrid table may include data from the chunks in a first format (e.g., Arrow format) and data in the one or more tables stored in a database in a second format (e.g., FDN).

At operation 916, the commit service may make the data in the blob available for query processing, as described in further detail below. The hybrid table may allow query processing of data in the blob which is not yet ingested into source tables.

At operation 918, the committed data may be ingested or migrated into their corresponding source table. The ingested data may create new partitions in the source table. The ingestion may be performed using a variety of techniques. In one embodiment, DML operation on the committed data may initiate ingestion. For example, if a DML operation touches upon a section (e.g., a row) of the committed data, that section or the chunk associated with that section may be ingested or migrated to the source table in response to the DML operation. Moreover, a background service may also operate to ingest the committed data at specified times (e.g., intervals). After committed data has been ingested, that data may be removed from storage.

Figure 10:
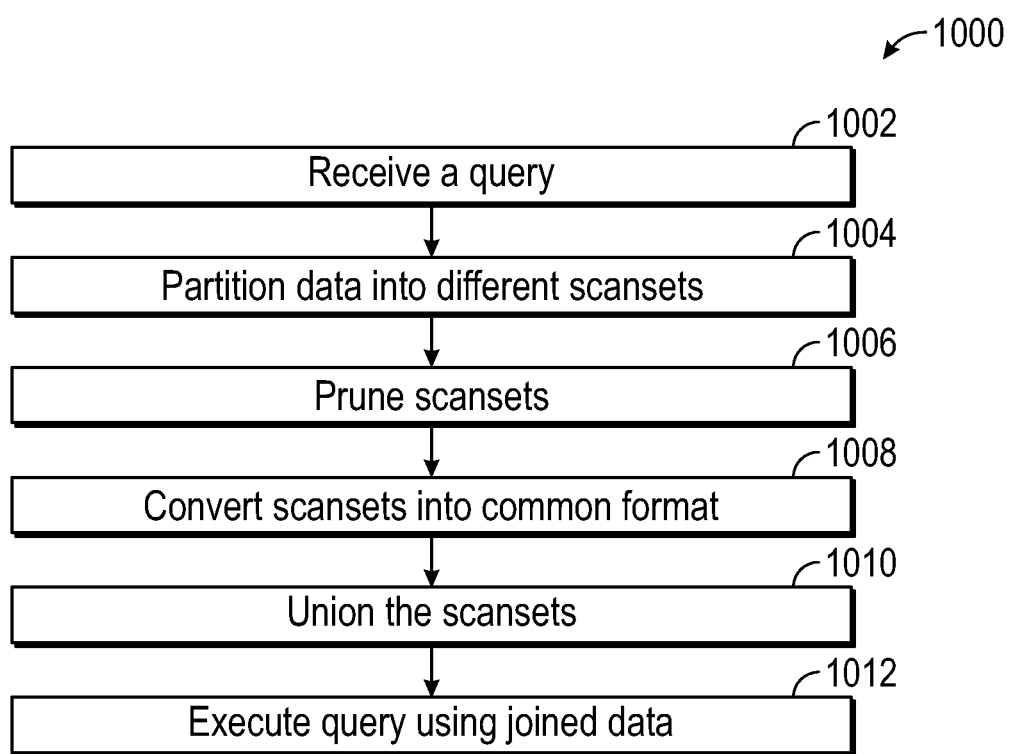
FIG. 10 shows a flow diagram of a method for processing a query, according to some example embodiments

FIG. 10 shows a flow diagram of a method 1000 for processing a query, according to some example embodiments. At operation 1002, the data system may receive a query. The query may relate to data stored in a source table stored in the data system and data committed for that table but not yet ingested into the source table, as described herein. Hence, the data system may process the query using both the data stored in the source table and the committed data stored in storage as a hybrid table, as described herein. The data may be provided into two formats, as described herein. The committed data may be stored in a first format (e.g., Arrow) and the data in the source table may be stored in a second format (e.g., FDN).

At operation 1004, the data for the query may be partitioned into different scansets, e.g., one for the data in the source table and one for the committed data. At operation 1006, the scansets may be pruned based on expression properties of the scansets. For example, the EP information associated with the chunks in the blobs of the committed data may be used to prune the committed data scanset. At operation 1008, the different scansets may be scanned and may be converted to a common format. The different format information may be converted to a common in-memory format during the scanning. At operation 1010, the different scansets, now converted to the common in-memory format, may be joined (e.g., union operator) for query execution. This joining of the committed data and source table data may present a unified view of the data by way of the hybrid table. At operation 1012, the query may be executed using the joined data, and a result of the query may be generated and transmitted to the requester of the query.

The techniques described herein provide benefits over other ingestion techniques. The techniques described herein provide direct data streaming to source tables over http calls without using other complex components. Hence, the techniques provide lower overheard with minimal configuration while providing high throughput. The techniques maintain ordering information of the new data. The ordering information from the client is maintained, and no other ordering may not be performed by the data system. Moreover, the techniques provide low latency and low cost. The new data is available for query after it is committed and before it is ingested as described herein (e.g., the use of the hybrid table). Thus, the data may be available for querying almost immediately (e.g., a few seconds).

Figure 11:
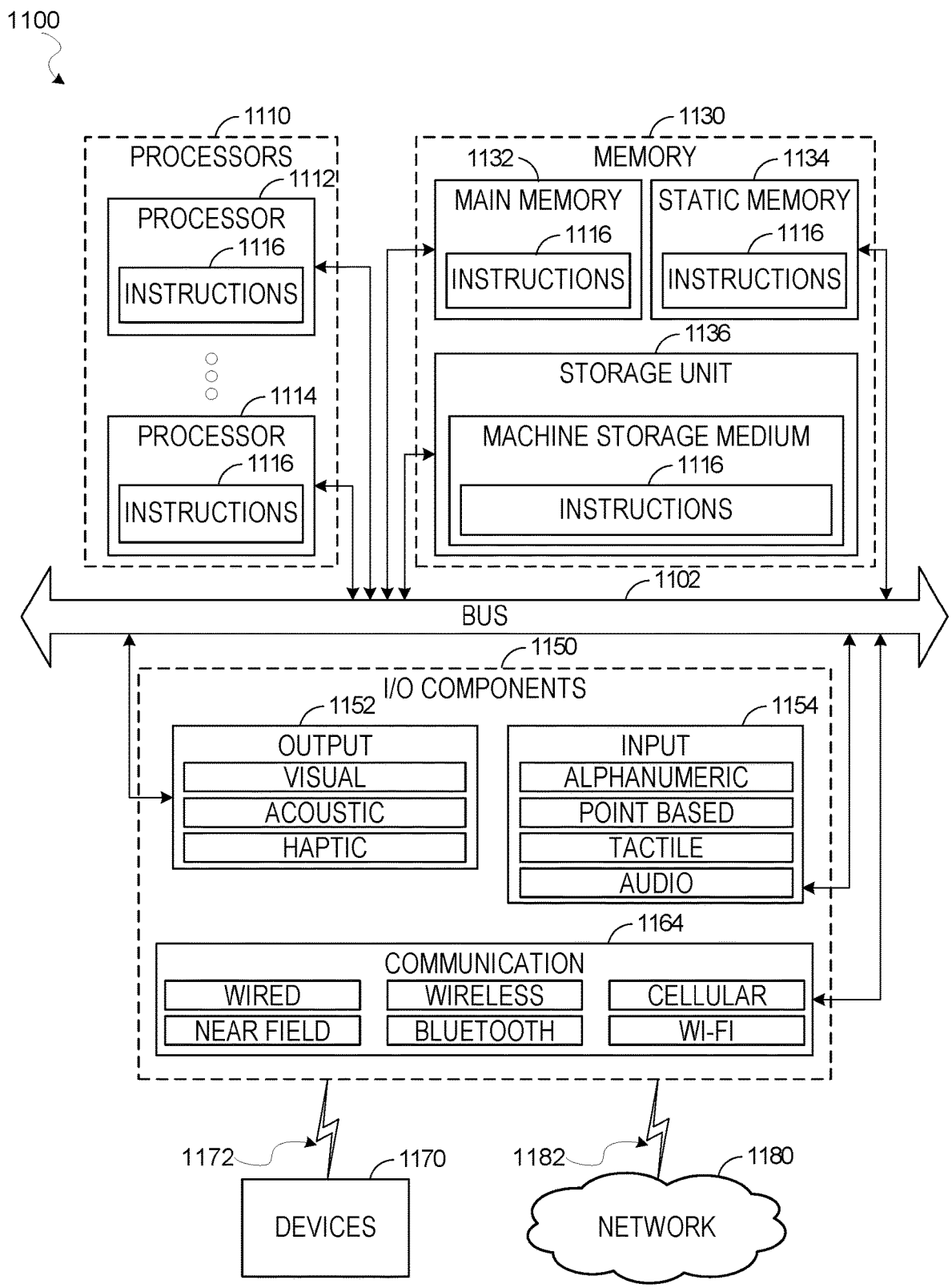
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described herein. As another example, the instructions 1116 may cause the machine 1100 to implement portions of the data flows described herein. In this way, the instructions 1116 transform a general, non-programmed machine into a particular machine 1100 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the remote computing device 106, the access management system 110, the compute service manager 112, the execution platform 114, the access management system 118, the Web proxy 120, and the devices 1170 may include any other of these systems and devices.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: receiving data from a client via one or more channels for ingestion into one or more source tables in a data system; storing the received data in a storage in a first format; based on a registration request for the received data, committing, by a processor, the received data stored in the storage and making the received data in the first format accessible for query processing before the received data is ingested into the one or more source tables; and ingesting the received data into the one or more source tables in a second format.

Example 2. The method of example 2, wherein the received data is organized into per-table sets, data in each set belonging to a single source table.

Example 3. The method of any of examples 1-2, wherein per-table sets are organized into per-account groups, data in each group belonging to a single account.

Example 4. The method of any of examples 1-3, further comprising: writing the received data to a metadata store; and generating a hybrid table for query processing, the hybrid table including the committed data in the first format and data from the one or more source tables in the second table.

Example 5. The method of any of examples 1-4, further comprising: for query processing: converting the committed data from the first format into a common format; converting the data from the one or more source tables into the common format; joining the committed data in the common format and the data from the one or more source tables in the common format to generate joined data; and executing a query based on the joined data.

Example 6. The method of any of examples 1-5, further comprising: retrieving expression properties of the received data; and pruning the received data based on the expression properties and the query.

Example 7. The method of any of examples 1-6, wherein the received data includes sequencing information.

Example 8. The method of any of examples 1-7, wherein ordering of the received data is maintained based on the sequencing information.

Example 9. A system comprising: at least one hardware processor; and at least one memory storing instructions that, when executed by the at least one hardware processor, cause the at least one hardware processor to perform operations implementing any one of example methods 1 to 8.

Example 10. A machine-readable storage device embodying instructions that, when executed by a machine, cause the machine to perform operations implementing any one of example methods 1 to 8.

What is claimed is:

1. A method comprising:
   receiving data from a client via one or more channels for ingestion into one or more source tables in a data system;
   storing the received data in a storage in a first format;
   committing, by a processor, the received data stored in the storage and making the received data in the first format accessible for query processing before the received data is ingested into the one or more source tables in a second format;
   generating a hybrid table for query processing, the hybrid table including the committed data in the first format and data from the one or more source tables in the second format;
   receiving a query;
   converting the committed data from the first format into a common format;
   converting the data from the one or more source tables into the common format;
   joining the committed data in the common format and the data from the one or more source tables in the common format to generate joined data; and
   executing the query based on the joined data.

2. The method of claim 1, wherein the received data is organized into per-table sets, data in each set belonging to a single source table.

3. The method of claim 2, wherein per-table sets are organized into per-account groups, data in each group belonging to a single account.

4. The method of claim 1, further comprising:
   retrieving expression properties of the received data; and
   pruning the received data based on the expression properties and the query.

5. The method of claim 4, wherein the expression properties include statistics of the committed data.

6. The method of claim 1, wherein the received data includes sequencing information.

7. The method of claim 1 wherein ordering of the received data is maintained based on the sequencing information.

8. A machine-storage medium embodying instructions that, when executed by a machine, cause the machine to perform operations comprising:
   receiving data from a client via one or more channels for ingestion into one or more source tables in a data system;
   storing the received data in a storage in a first format;
   committing the received data stored in the storage and making the received data in the first format accessible for query processing before the received data is ingested into the one or more source tables in a second format;
   generating a hybrid table for query processing, the hybrid table including the committed data in the first format and data from the one or more source tables in the second format;
   receiving a query;
   converting the committed data from the first format into a common format;
   converting the data from the one or more source tables into the common format;
   joining the committed data in the common format and the data from the one or more source tables in the common format to generate joined data; and
   executing the query based on the joined data.

9. The machine-storage medium of claim 8, wherein the received data is organized into per-table sets, data in each set belonging to a single source table.

10. The machine-storage medium of claim 9, wherein per-table sets are organized into per-account groups, data in each group belonging to a single account.

11. The machine-storage medium of claim 8, further comprising:
    retrieving expression properties of the received data; and
    pruning the received data based on the expression properties and the query.

12. The machine-storage medium of claim 11, wherein the expression properties include statistics of the committed data.

13. The machine-storage medium of claim 8, wherein the received data includes sequencing information.

14. The machine-storage medium of claim 13, wherein ordering of the received data is maintained based on the sequencing information.

15. A system comprising:
 at least one hardware processor; and
 at least one memory storing instructions that, when executed by the at least one hardware processor, cause the at least one hardware processor to perform operations comprising:
 receiving data from a client via one or more channels for ingestion into one or more source tables in a data system;
 storing the received data in a storage in a first format;
 committing the received data stored in the storage and making the received data in the first format accessible for query processing before the received data is ingested into the one or more source tables in a second format;
 generating a hybrid table for query processing, the hybrid table including the committed data in the first format and data from the one or more source tables in the second format;
 receiving a query;
 converting the committed data from the first format into a common format;
 converting the data from the one or more source tables into the common format;
 joining the committed data in the common format and the data from the one or more source tables in the common format to generate joined data; and
 executing the query based on the joined data.

16. The system of claim 15, wherein the received data is organized into per-table sets, data in each set belonging to a single source table.

17. The system of claim 16, wherein per-table sets are organized into per-account groups, data in each group belonging to a single account.

18. The system of claim 15, the operations further comprising:
 retrieving expression properties of the received data; and
 pruning the received data based on the expression properties and the query.

19. The system of claim 18, wherein the expression properties include statistics of the committed data.

20. The system of claim 15, wherein the received data includes sequencing information.

21. The system of claim 20, wherein ordering of the received data is maintained based on the sequencing information.

* * * * *